United States Patent Office 3,589,929
Patented June 29, 1971

3,589,929
PROCESS FOR MANUFACTURE OF POROUS SHEET MATERIAL AND A POROUS SHEET HAVING A TEXTILE SUBSTRATE
Cornelis A. Smolders, Velp Gelderland, and Joseph T. V. M. Geusgens, Dieren Gelderland, Netherlands, assignors to Algemene Kunstzijde Unie N.V., Arnham, Netherlands
No Drawing. Filed May 13, 1968, Ser. No. 728,753
Claims priority, application Netherlands, May 18, 1967, 6706867
Int. Cl. B29d 27/04; B44d 1/44
U.S. Cl. 117—63                                        9 Claims

ABSTRACT OF THE DISCLOSURE

A process for the manufacture of a porous sheet material which comprises the steps of applying a liquid homogeneous mixture of a polymer, e.g., a polyurethane, and an auxiliary substance, e.g., caprolactam, to a substrate, cooling the mixture to a temperature at which there is formed a solid phase substantially comprising the polymer, the auxiliary substance comprising a solvent for the polymer which upon cooling of the mixture precipitates from the mixture into a separate solid phase before the formation of the solid polymer phase is completed, and thereafter removing the auxiliary substance to form a homogeneous uniform porous sheet material.

---

This invention relates to a process for the manufacture of a porous sheet material, especially a porous material that is suitable for the manufacture of artificial leather.

More particularly this invention relates to a process in which a liquid homogeneous mixture of a polymer and an auxiliary substance is applied to a substrate, is at least cooled to a temperature at which there is formed a solid phase substantially comprising the polymer, and thereafter the auxiliary substance is removed to form a homogeneous uniform porous polymeric material. The term "solid phase" is meant to include a concentrated, hardly deformable to almost stiff, polymer phase.

A process similar to the subject invention is known and disclosed in the Netherlands patent application 6511220. The disclosed process particularly relates to the impregnation or coating of a porous substrate such as a fiber sheet. In this known process use is made of an auxiliary composition or substance that is a mixture of a solvent and a non-solvent for the polymer, the mixture ratio being such that the polymer gels or coagulates upon being cooled. The liquid auxiliary substance is thereupon removed by, for instance, washing or evaporation. It is preferred that the solvent used should be a water miscible solvent such as dimethylformamide (DMF), and that the non-solvent used should be water.

However, it has been found that this known process suffers from several disadvantages. One disadvantage is that the mixture ratio of the solvent to non-solvent must be kept within narrow limits in order that a porous product of uniform quality may be obtained. A minor change in the non-solvent content (which amounts to approximately 4% by weight of water for the dimethylformamide-water mixtures) appreciably influences the temperature and the speed at which the polymer gels or coagulates. The reproducibility, especially on an industrial scale, of the product quality, particularly as far as the size and size distribution of the pores are concerned, is therefore no simple matter.

Another disadvantage consists in that, after removal from the coagulated polymer layer by evaporation or washing, the usually expensive solvent is lost or cannot be recovered except by laborious separation methods.

Still other and serious disadvantages are that the coagulation of the polymer takes place under such conditions that the polymer will generally deposit in the sheet in a non-homogeneous manner, and that bonding to the fibers or conglomeration of the polymer thereon, particularly at the fiber crossings, or sticking together of the fibers is difficult to avoid.

As a result, the substrates impregnated or coated in this known way usually lack the desired suppleness.

Advantageously, the process of this invention does not, or to a far lesser extent, show these disadvantages and even offers additional advantages.

Thus, this invention contemplates a process for the manufacture of a porous sheet material wherein a liquid homogeneous mixture of a polymer and an auxiliary substance i.e. a solvent material for the polymer is applied to a substrate and is cooled to a temperature at which there is formed a solid phase substantially comprising the polymer, and thereafter the auxiliary substance is removed, further characterized in that the auxiliary substance used comprises a solvent for the polymer, which upon cooling of the mixture precipitates from the mixture into a separate solid phase before the formation of the solid polymer phase is completed.

For convenience, in the subsequent description of the process according to the invention, use is made of the terms "segregation temperature" and "precipitation temperature," which are defined as follows:

"Segregation temperature" is the temperature at which, during the cooling of the initially liquid polymer-auxiliary substance mixture, segregation thereof with formation of a solid polymer phase (gel phase) takes place; and "Precipitation temperature" is the temperature at which, during the cooling of the initially liquid mixture of polymer and auxiliary substance, the auxiliary substance starts to precipitate into a separate solid phase.

Furthermore, the process according to the invention is also characterized in that use is made of a mixture of a polymer and an auxiliary substance having a segregation temperature which is not higher than the precipitation temperature, i.e., the segregation temperature is lower than or equal to the precipitation temperature.

It must, of course, be possible for an auxiliary substance of the type used by this invention to form, if desired, at an elevated temperature, a liquid homogeneous mixture with the polymer. It is often advantageous but not necessary to make use of a mixture formed at an elevated temperature of, for example, 50° C. or higher, having a precipitating temperature above room temperature, since cooling down to room temperature then will be sufficient to effect precipitation. This could be done, for instance, by simply exposing the mixture to the atmosphere, by using cold drums or rollers, or by spraying with an appropriate cooling liquid or immersion therein. The required cooling time may be reduced by the application of a cooling medium having a temperature of, for example, 10° C. or lower. It also should be added that the rate of cooling, and hence the morphology of the precipitated auxiliary substance (crystals), may influence the structure of the coagulated polymer. In this connection it may also be of advantage to decrease the temperature stepwise.

As auxiliary substance, use may be made of a single compound which is a solvent for the polymer or a mixture of compounds or solvents which has suitable solvent action and precipitation temperature. If the auxiliary substance is a mixture of compounds, then it is in principle immaterial what precipitation temperature each separate compound has, provided that the precipitation temperature of the mixture is such as to cause its timely precipitation.

It is preferred, however, that use should be made of an auxiliary substance which substantially consists of a single compound, more particularly a low-molecular weight compound that is a solvent having a solidifying point which is suitable for obtaining the envisaged precipitation.

Suitable solvents include lactams such as pyrrolidone (11e,α,γ-butyrolactam), caprolactam, capryllactam and N-substituted lactams; as well as trimethylolpropane, benzenesulphonamide, toluenesulphonamide, p-dichlorobenzene, 3,5-xylenol, naphthalene, lauric acid, and the like.

In connection with the required removal of the auxiliary substance after coagulation of the polymer it is of advantage to use an auxiliary substance which is miscible with water.

Particularly favorable results are obtained if the solvent used is caprolactam. Caprolactam has a solidifying point of approximately 70° C. and is excellently miscible with and soluble in water. It is non-toxic and may fairly readily be recovered from aqueous solutions. The presence in the caprolactam of a small amount of water, for example, of from 3 to 5% by weight, is not objectionable to the use thereof as auxiliary substance in the process according to the invention, provided that the segregation temperature is not higher than the precipitation temperature.

A large number of polymers and copolymers or mixtures thereof are suitable for application in the process according to the invention. Many suitable polymers are mentioned and described in, inter alia, the Netherlands patent application 65,11220 and the U.S. Pat. No. 3,100,721.

Particularly suitable polymers are the polyurethanes, either alone or in admixture with other polymers such as polyvinylchloride and polyvinylalcohol. Copolymers of ethylene and vinylacetate and of ethylene and propylene are other examples of rubberlike polymers which may be used with advantage. Favorable results are also obtained when polyvinylalcohol and poly-2,6-dimethylphenyleneoxide rae used.

With due observance to the requirement made with regard to the level of the precipitation temperature relative to the segregation temperature, the many suitable auxiliary substances or solvents, and polymers available allows a wide variation in the composition of the liquid polymer-auxiliary substance mixture.

It has been found that the precipitation temperature is in general to a greater or lesser degree influenced by the polymer concentration; whereas the polymer concentration usually has no appreciable influence on the segregation temperature. Consequently, it may happen, in the case of a particular polymer-auxiliary substance combination, that a certain range of concentrations is unsuitable, because within this range the segregation temperature is higher than the precipitation temperature.

Whether a particular polymer-auxiliary substance combination is in principle suitable for application may in a simple manner be determined beforehand. To this end polymer-auxiliary substances mixtures of different concentrations, generally prepared at an elevated temperature, may be cast onto, for instance, a pre-heated glass plate, and while the cast composition is cooling down it may be determined whether or not the auxiliary substance precipitates in time. Under the conditions described, precipitation of the auxiliary substance invariably starts at only a few points (nuclei) from which the precipitation phase grows further. On the other hand, segregation above the precipitation temperature always takes place evenly over the entire glass plate and is attended with a gradually increasing turbidity. This simple visual method (which when necessary can be amplified by microscopic investigation) provides a sufficiently clear check on whether the requirements of this invention have been satisfied.

In these tests it can also suitably be determined which liquids or solvents may be used for removing the auxiliary substance after coagulation of the polymer. It should be added that in principle the agent to be applied for removing the auxiliary substance may often also be used as cooling bath for the polymer-auxiliary substance mixture. In that case precipitation of the auxiliary substance must take place so rapidly that extraction of the auxiliary substance is not of any importance until after precipitation.

Examples of suitable combinations of polymer-auxiliary substance-washing liquid are polyurethane-caprolactam-water; polyvinyl alcohol-caprolactam-alcohol; polyethylene-naphthalene-chloroform; polyphenyleneoxide-xylenol-alcohol; ethylene-vinyl acetate copolymer-p-dichlorobenzene-alcohol, and many other such combinations.

It should be noted that the precipitation of the auxiliary substance, particularly as to the fineness and distribution of the precipitate, may be influenced by the addition of solid nucleating particles. It is also believed that the presence of fiber material, as found, for instance, in the impregnation of textile substances, has a similar effect. The addition of surface-active agents also may influence the morphology of the precipitated phase and hence the porosity of the polymer.

In accordance with the invention, a temporary or a permanent substrate may be used for supporting the polymer-auxiliary substance mixture.

In the case of a temporary substrate, unsupported, porous, relatively thick sheets may be manufactured by applying the polymer-auxiliary substance mixture on to an impervious substrate; for example, a glass or metal plate, and then by stripping the porous sheet formed thereupon from the plate. This method is suitable to be used in the manufacture of, inter alia, synthetic sponges and sponge cloths. The prior inclusion in the polymer-auxiliary substance mixture of fibers will contribute to the reinforcement of the products thus obtained.

Moreover, the process according to the invention is especially suitable to be used for the impregnation or coating of porous permanent substrates such as woven, knitted and non-woven textile materials. The textile materials impregnated and/or coated according to the invention, particularly the non-woven fiber or filament sheets, are extremely suitable in the manufacture of substitutes for leather products such as wash-leather, shoe lining and shoe uppers.

One of the advantages of the present invention is particularly manifest in the use of a permanent substrate. In this case, as a result of the timely precipitation or crystallization of the auxiliary substance, bonding to the fibrous material of the substrate or conglomeration thereon of the polymer can hardly take place. Consequently, a very favorable distribution of the polymer over the interstices between the fibers, is obtained. Even when polyurethanes and fiber material from polyesters and polyamides (which, in general, strongly adhere to polyurethanes) are used, the process of the invention provides an impregnate which does not or only slightly adheres to the fibers or which does not cause the fibers to stick to one another. The absence of the sticking of fibers or of direct adhesion of the polymer impregnate to the fibers of the permanent substrate, particularly at the fiber crossings, as well as a uniform distribution of the polymer are essential for obtaining supple sheets and substrates.

The choice of the fibers or filaments to be used for the manufacture of the textile substrates is not critical. The substrate, more particularly fiber sheets and filament sheets, or mats, may be manufactured from polyamides, polyesters, polypropylene, polyvinylalcohol, acrylic polymers, regenerated cellulose, wool, cotton, glass, and the like, or from mixtures thereof.

As mentioned before, the process according to the invention is of particular importance in the manufacture of leather substitutes. Analogous to natural leather, an artificial leather article may, in an appropriate manner, be composed of an inner zone or base substrate and an outer zone or grain layer, between which two zones there may, if desired, be provided an adhesive layer. Such a build-up of artificial leather products is described in, inter alia, the Netherlands patent applications 6510656 and 6604404. The polymers and textile substrates mentioned in these patent applications also may be used in carrying out the process of this invention.

It should be added that for the impregnating and/or coating processes mentioned in said patent applications use is made of a polymer-auxiliary substance-type mixture of which the precipitation temperature is lower than the segregation temperature and in which for the purpose of obtaining a satisfactory pore structure there is included a removable solid filler. In the manufacture of an artificial leather article referred to above, the subject process may with advantage be applied both in the preparation of an impregnated base substrate and the formation of the grain layer.

It will be understood that it is not essential that the grain layer also should be applied by the process according to the invention. The use of caprolactam as auxiliary substance offers some marked advantages because it is non-toxic, soluble in water, readily recoverable and substantially non-explosive. These advantages are maintained also when this solvent is used without the condition required with respect to the level of the precipitation temperature being satisfied. This condition is, for example, no longer satisfied if in connection with the polymer and the polymer concentration to be applied, the amount of water added to the caprolactam is so high (usually more than 5% by weight) that the precipitation temperature will be lower than the segregation temperature. However, even in this case it is yet possible to effect timely precipitation of the auxiliary substance, e.g., caprolactam, according to the invention by heating and keeping the impregnated or coated substrate at a temperature above the segregation temperature for a sufficient time to evaporate an adequate amount of the non-crystallizing solvent constituent, i.e., water or like constituents.

It will be appreciated that, particularly for leather articles, it is often desirable to use a base substrate having a structure gradient across the thickness thereof. Using the present process this gradient may be obtained if after the polymer-auxiliary substance mixture has been applied to the substrate (for instance, by coating, casting, immersion, or a similar technique), the substrate is cooled down while maintaining a temperature gradient across the thickness thereof. A structure gradient may also be realized by cooling the impregnated substrate from one side in accordance with the subject process while treating the other side in the normal manner with a non-solvent which is miscible with the auxiliary substance, but which does not induce its precipitation.

The invention will be further described in the following examples which are merely illustrative and are not intended to be restrictive of the scope of the invention.

EXAMPLE I

Unsupported films are manufactured by casting a homogeneous liquid polymer-auxiliary substance mixture on to a cold glass plate, followed by fully cooling the cast film in air, and subsequently washing out the auxiliary substance.

The following combinations of polymer-auxiliary substance-washing agent are used.

| Run No. | Polymer | Auxiliary substances | Washing agent |
|---|---|---|---|
| 1 | Polyurethane [a] | Caprolactam | Water. |
| 2 | do.[a] | 3,5-xylenol | Ethanol. |
| 3 | do.[b] | Caprolactam | Water. |
| 4 | do.[c] | do. | Do. |
| 5 | Ethylene vinylacetate copolymer.[d] | p-Dichlorobenzene | Do. |
| 6 | do.[e] | do. | Do. |
| 7 | do.[f] | do. | Do. |
| 8 | Polyvinyl alcohol [g] | Caprolactam | Do. |

[a] Estane 5707 F1—a product of B. F. Goodrich.
[b] Estane 5740 X1—a product of B. F. Goodrich.
[c] Desmophan LK 1329—a product of Bayer.
[d, e, f] Elvax 40, 150, and 260, respectively—products of Du Pont.
[g] Elvanol—a product of Du Pont.

The polymer-auxiliary substance mixtures, which have a polymer content of 15% by weight in the runs 1 to 7 and 5% by weight in run 8, are prepared at a temperature of 80° to 170° C. and then cast on to a glass plate held at 20° C. The mixtures in all runs satisfy the requirement laid down in the invention, the precipitation temperature being in the range of from approximately 30° to 60° C. In all runs there are obtained supple, properly cohering and generally elastic films with a satisfactory pore structure and substantially perfect uniform polymer distribution.

EXAMPLE II

The experiment described in this example serves to illustrate the application of the invention in which a permanent substrate in the form of a fiber sheet is impregnated with the polymer-auxiliary mixture. Use is made of a needle-punched and properly shrunk polyvinyl alcohol fiber sheet having a weight of 200 g./m.$^2$. The sheet is steeped in a solution of 15 parts by weight of polyurethane used in run 1 of Example I, in 80 parts by weight of caprolactam and 5 parts by weight of water at 65° C. After a steeping time of approximately 45 seconds the sheet is squeezed to a press factor of 4.5 to 5 using heated rolls, and then rapidly cooled in air at approximately 0° C. Next, the crystallized caprolactam is washed out with water at room temperature.

On microscopical examination, the sheets thus filled or impregnated show a highly homogeneous polymer distribution as well as a satisfactory pore structure. The sheets are also very supple.

When using the lower press factor, the sheet obtained has a density of approximately 0.28 g./cm.$^3$ and a tear resistance of 3.70 kg./mm. thickness.

When using the higher press factor, the sheet obtained has a density of approximately 0.32 g./cm.$^3$ and a tear resistance of 3.54 kg./mm. thickness.

For the purpose of comparison a fiber sheet of the above-described type is steeped in a solution of 15 parts by weight of the polyurethane in 85 parts by weight of dimethyl formamide (DMF) and 5 parts by weight of water at 50° C. Then, after squeezing to a press factor of approximately 4.7, the sheet is immersed in an aqueous coagulation bath of 20° C. containing DMF, and finally washed with water. The resulting filled sheet is far less supple than the sheets treated by the process of this invention, and has, at a density of approximately 0.29 g./cm.$^3$, a tear resistance of only 2.25 kg./mm. thickness.

EXAMPLE III

In this experiment the permanent substrate used is a needle-punched nylon fiber sheet having a weight of 200 g./m.$^2$.

The sheet is impregnated, cooled and washed out as described in Example II, but this time a press factor of about 7 is applied. The resulting filled sheet shows a highly homogeneous distribution of the polymer and is very supple. When the auxiliary substance used is DMF, it is impossible to obtain such a highly uniform distribution of the polymer because the fibers and the fiber bundles stick together. Furthermore, the sheets obtained are not very supple and are sometimes even boardy.

EXAMPLE IV

The permanent substrate used in this experiment is a sheet made from polyethylene terephthalate fibers having a weight of 150 g./m.$^2$.

The sheet is impregnated with a solution in p-dichlorobenzene of 10% by weight of the ethylene-vinylacetate copolymer used in run 7 of Example I. After the sheet has been squeezed to a press factor of 4, it is cooled an washed out with ethanol.

The resulting sheet shows an excellent distribution of the impregnant over the fibers.

EXAMPLE V

In this experiment a needle-punched rayon fiber sheet having a weight of 400 g./m.$^2$ is impregnated with a solution in caprolactam of 15% by weight of a polymer mixture at 75° C. The polymer mixture consists of 70 parts by weight of the polyurethane used in run 1 of Example I, and 30 parts by weight of a copolymer prepared from vinylchloride and maleic acid anhydride (designated as Vinoflex 452 and marketed by BASF).

After the sheet has been squeezed out to a press factor of approximately 5, it is cooled and washed out with water. The resulting fiber sheet is supple and homogeneously filled with the impregnant of the invention.

While the novel aspects of this invention have been illustrated and described and are pointed out in the appended claims, it is to be understood that various omissions, modifications, and substitutions in the aspects illustrate and described may be made by those skilled in the art without departing from the spirit and scope of the invention.

What is claimed is:

1. A process for the manufacture of a porous polymer-containing sheet material which comprises preparing a liquid homogeneous mixture consisting essentially of a film-forming polymer and a solvent material for the polymer at an elevated temperature above the melting point of the solvent material, said mixture having a segregation temperature at which, during cooling of said mixture, segregation thereof with formation of a solid polymer phase takes place, and a precipitation temperature at which the solvent material, upon cooling of the mixture, starts to precipitate from said mixture into a separate solid phase, said segregation temperature being a temperature which is not higher than the precipitation temperature; applying said liquid homogeneous mixture to a substrate; cooling the mixture to a temperature at which there is formed a solid phase substantially comprising the polymer, said solvent material precipitating from said mixture into a separate solid phase before formation of the solid polymer phase is completed; and thereafter removing the solvent material with a washing agent which is a non-solvent for the polymer and which is miscible with the solvent material to form a homogeneous uniform porous polymer-containing sheet material 2. The process of claim 1 in which the solvent material comprises a single low-molecular weight organic solvent having a solidifying point which is sufficiently high to cause its timely precipitation before the formation of the solid polymer phase is completed.

3. The process of claim 1 in which the polymer comprises a polyurethane, the solvent material comprises caprolactam and the washing agent comprises water.

4. The process of claim 1 in which the polymer comprises a copolymer of ethylene and vinyl acetate, the solvent material comprises p-dichlorobenzene and the washing agent comprises ethanol.

5. The process of claim 1 in which the polymer comprises a polyvinyl alcohol, the solvent material comprises caprolactam and the washing agent comprises ethanol.

6. The process of claim 1 in which the polymer comprises a mixture of a polyurethane and a copolymer of vinylchloride and maleic acid anhydride, the solvent material comprises caprolactam and the washing agent comprises water.

7. The process of claim 1 in which the mixture of polymer and solvent material is applied to a textile substrate.

8. A porous polymer-containing sheet material produced by the process of claim 1.

9. Leather substitutes produced by the process of claim 7.

References Cited

UNITED STATES PATENTS

| | | | |
|---|---|---|---|
| 2,707,201 | 4/1955 | Fernald et al. | 264—49X |
| 2,846,727 | 8/1958 | Bechtold | 264—49 |
| 2,988,782 | 6/1961 | Parrish et al. | 260—29.2X |
| 3,020,597 | 2/1962 | Smith-Johannsen | 264—49 |
| 3,100,721 | 8/1963 | Holden | 264—41UX |
| 3,266,966 | 8/1966 | Patchell | 264—49X |
| 3,446,782 | 5/1969 | Okazaki et al. | 260—29.2X |
| 3,484,273 | 12/1969 | Kawase et al. | 117—135.5X |

FOREIGN PATENTS

| | | | |
|---|---|---|---|
| 1,044,502 | 10/1966 | Great Britain | 264—49 |
| 1,066,061 | 4/1967 | Great Britain | 264—49 |

PHILIP E. ANDERSON, Primary Examiner

U.S. Cl. X.R.

117—135.5, 138.8, 145, 161; 161—159, 164, 190; 260—2.5; 264—49, 331